(12) United States Patent
Lee

(10) Patent No.: US 12,077,089 B2
(45) Date of Patent: Sep. 3, 2024

(54) POSITION CLUTCH RING SYSTEM

(71) Applicant: Illinois Tool Works Inc., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 83 days.

(21) Appl. No.: 17/675,040

(22) Filed: Feb. 18, 2022

(65) Prior Publication Data

US 2022/0340071 A1     Oct. 27, 2022

Related U.S. Application Data

(60) Provisional application No. 63/250,856, filed on Sep. 30, 2021, provisional application No. 63/177,651, filed on Apr. 21, 2021.

(51) Int. Cl.
*B60P 7/08*     (2006.01)

(52) U.S. Cl.
CPC ........... *B60P 7/0807* (2013.01); *B60P 7/0823* (2013.01)

(58) Field of Classification Search
CPC .. B60P 7/08; B60P 7/0807; B60P 7/06; B60P 3/079; F16B 45/00; B60R 11/02
USPC ......... 410/101, 102, 106–107, 109–112, 116
See application file for complete search history.

(56) References Cited

U.S. PATENT DOCUMENTS

| | | | |
|---|---|---|---|
| 4,400,856 A | 8/1983 | Tseng | |
| 4,630,982 A | 12/1986 | Fenner | |
| 5,052,869 A * | 10/1991 | Hansen | B60P 7/0807 410/101 |
| 6,030,159 A | 2/2000 | Herrick et al. | |
| 6,065,917 A | 5/2000 | Shambeau et al. | |
| 6,138,975 A * | 10/2000 | McDaid | B61D 45/001 248/499 |
| 6,665,911 B1 * | 12/2003 | Huang | B60P 7/0807 410/105 |
| 7,201,550 B2 * | 4/2007 | Borrmann | B60P 7/0807 410/104 |
| 7,988,115 B2 | 8/2011 | Lee et al. | |
| 8,388,286 B2 | 3/2013 | Niklas | |
| 8,677,569 B2 | 3/2014 | Ruzich et al. | |
| 9,045,070 B2 | 6/2015 | Pauluk et al. | |
| 9,610,887 B1 | 4/2017 | Parra Becerra | |
| 10,023,097 B1 * | 7/2018 | Harris | B60P 7/0807 |
| 10,040,400 B2 * | 8/2018 | Cho | B60R 5/00 |
| 10,369,920 B2 * | 8/2019 | Sbongk | B60P 7/0807 |

(Continued)

FOREIGN PATENT DOCUMENTS

| | | |
|---|---|---|
| EP | 1623872 B1 | 11/2009 |
| JP | 6041585 B2 | 12/2016 |
| JP | 6279103 B2 | 2/2018 |

*Primary Examiner* — Stephen T Gordon
(74) *Attorney, Agent, or Firm* — McAndrews, Held & Malloy, Ltd.

(57) ABSTRACT

Disclosed is a tie down assembly. The tie down assembly having a ring, a bracket assembly, a support insert, and a position-locking mechanism. The support insert is configured to secure the ring relative to the bracket assembly. The ring being configured to rotate relative to the bracket assembly about an axis. The position-locking mechanism is configured to secure the ring at one or more rotational positions about said axis via one or more engagement features. In one example, the position-locking mechanism is a detent mechanism.

20 Claims, 7 Drawing Sheets

(56) References Cited

U.S. PATENT DOCUMENTS

| | | |
|---|---|---|
| 10,384,616 B2 | 8/2019 | Sotome |
| 10,899,265 B2* | 1/2021 | McKimson ........... B60P 7/0807 |
| 11,015,639 B1* | 5/2021 | Huang ................. F16B 45/002 |
| 11,229,263 B2 | 1/2022 | Cho |
| 2008/0115739 A1* | 5/2008 | Clenney ............... A01K 27/001 |
| | | 119/863 |
| 2018/0339661 A1* | 11/2018 | Sotome .................... B60R 7/08 |
| 2020/0353856 A1* | 11/2020 | Egigian ................ B60P 7/0807 |

* cited by examiner

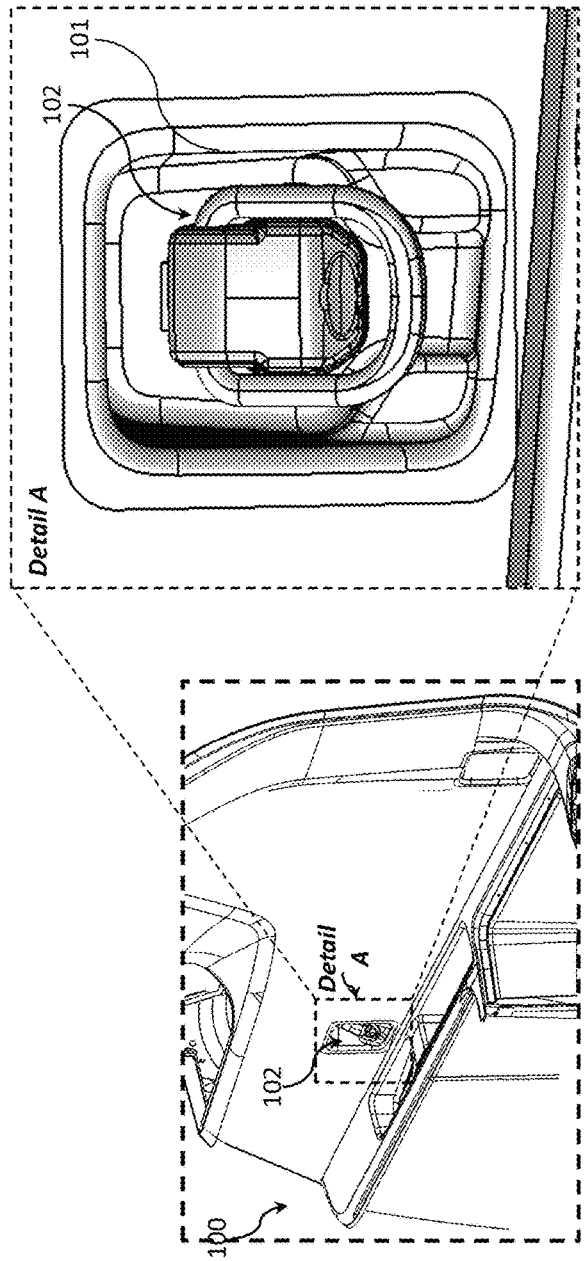
FIG. 1a
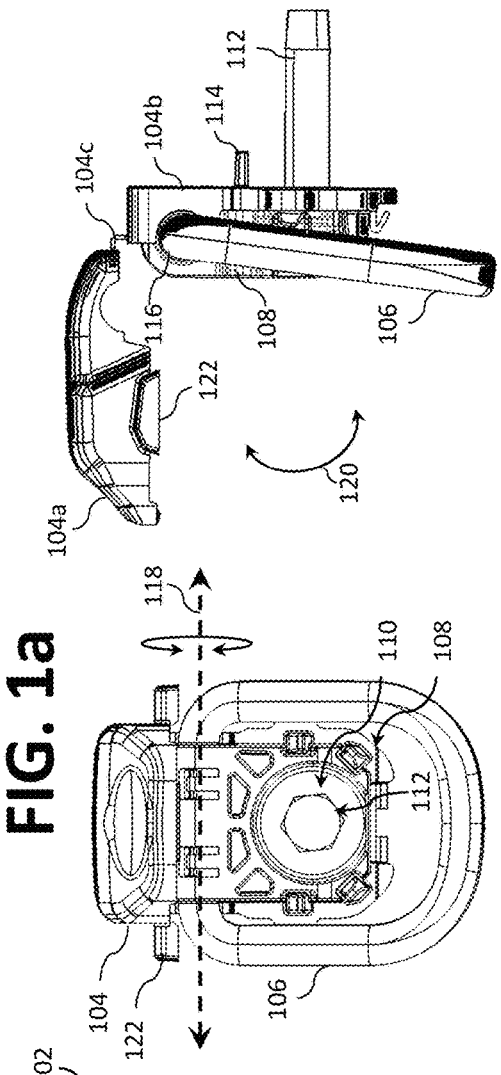
FIG. 1b
FIG. 1c
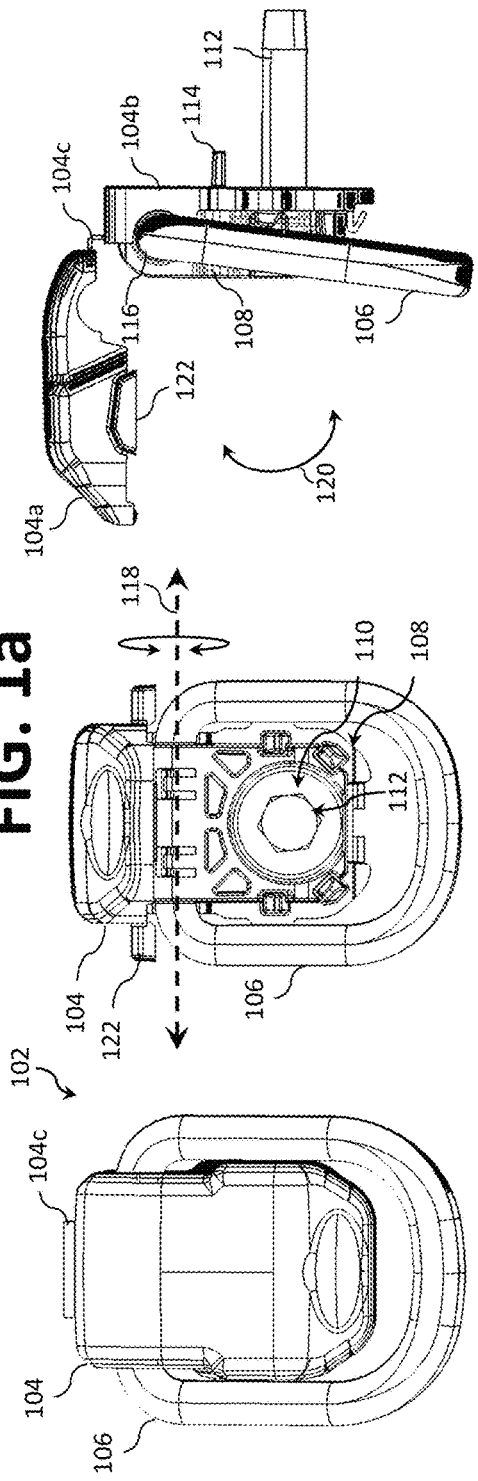
FIG. 1d

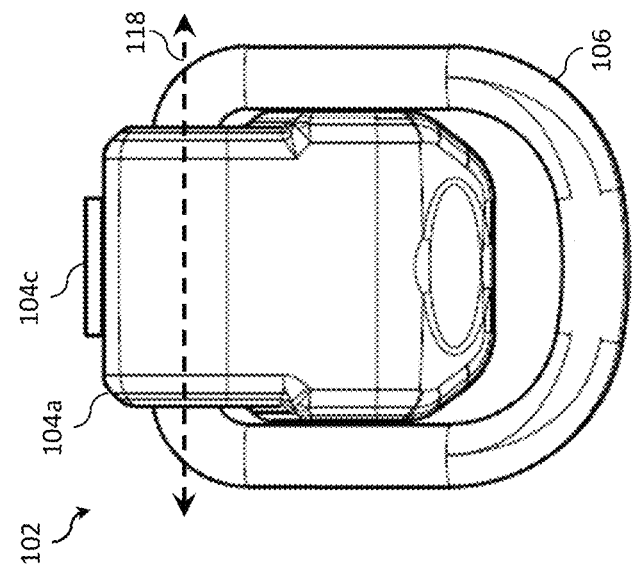
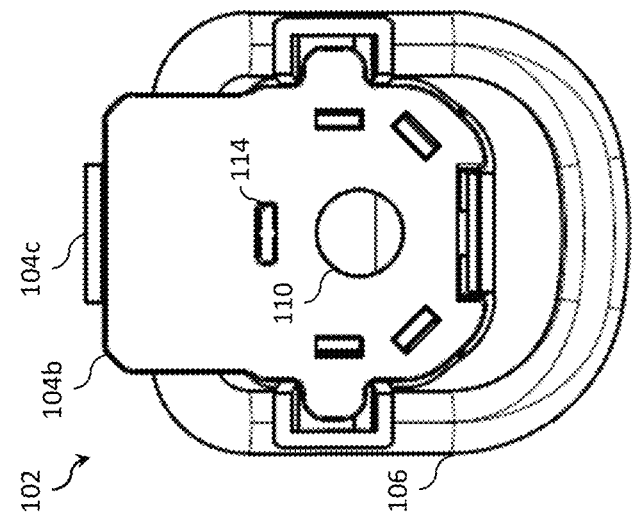
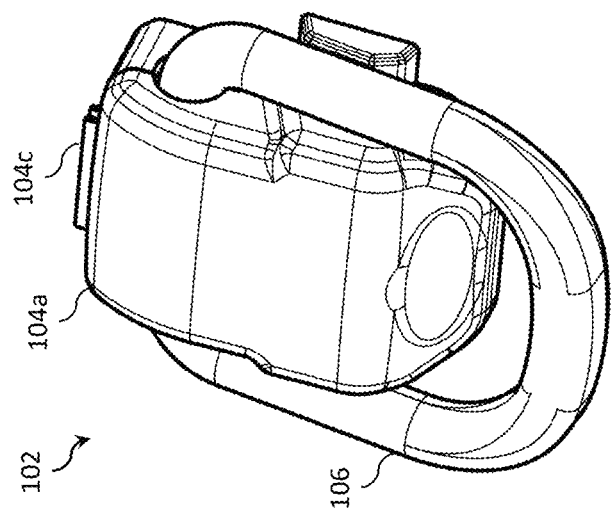
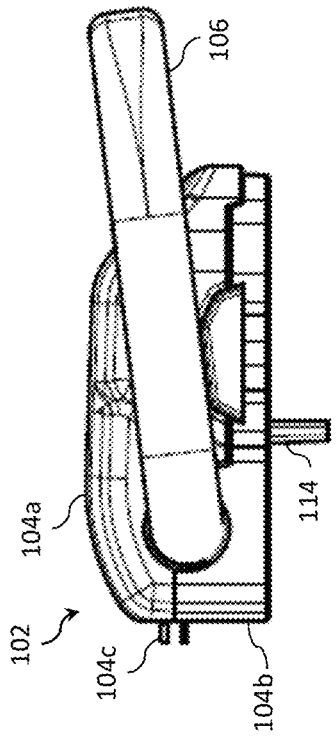
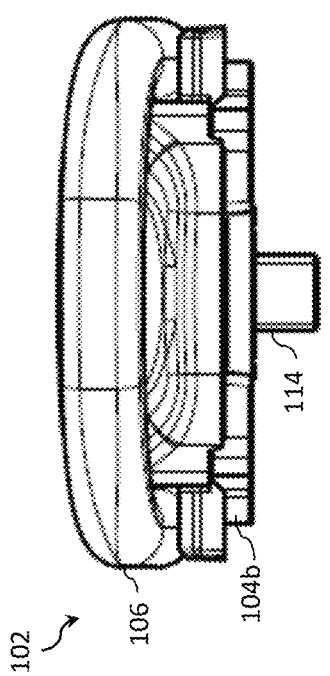

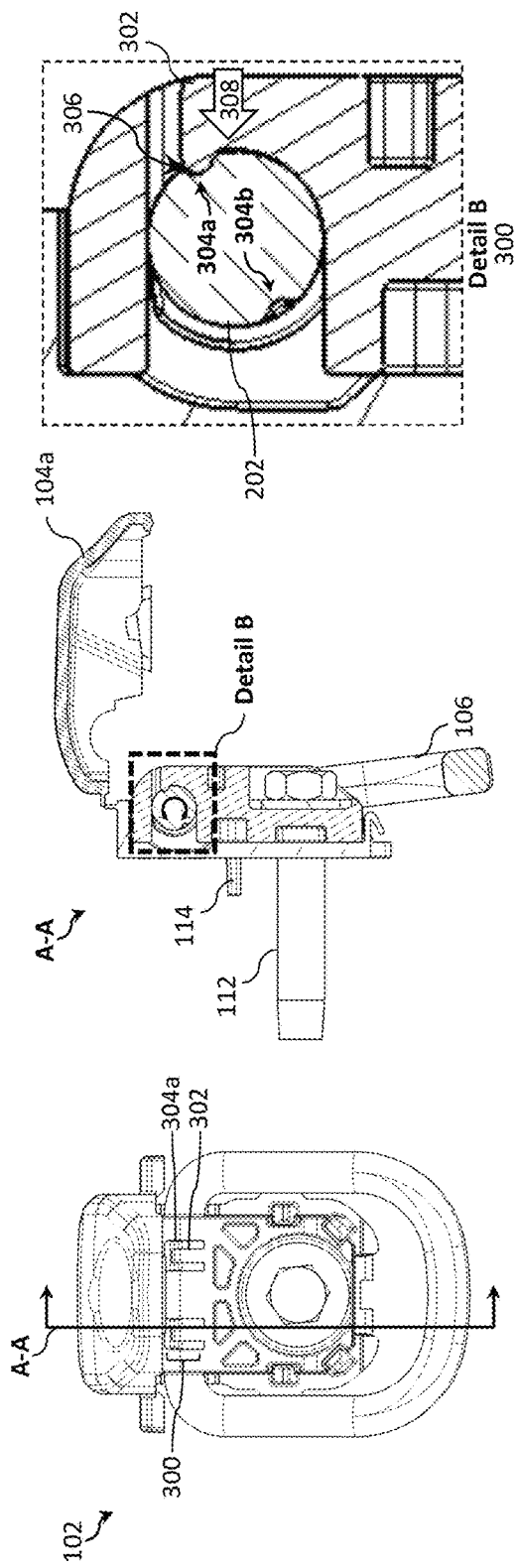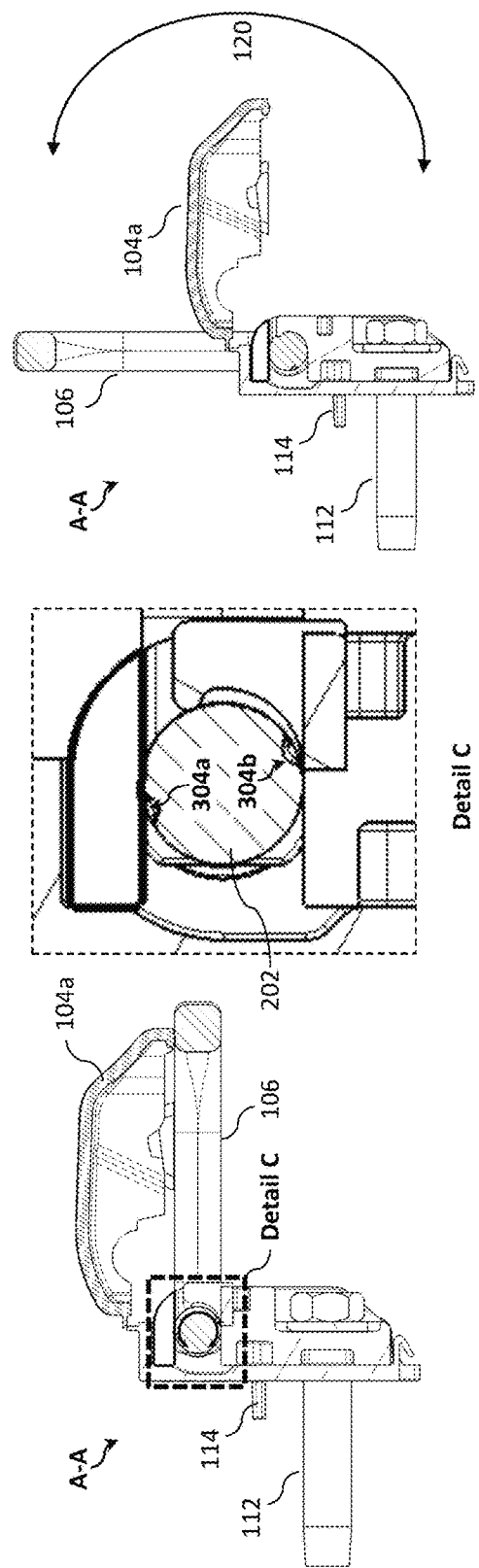

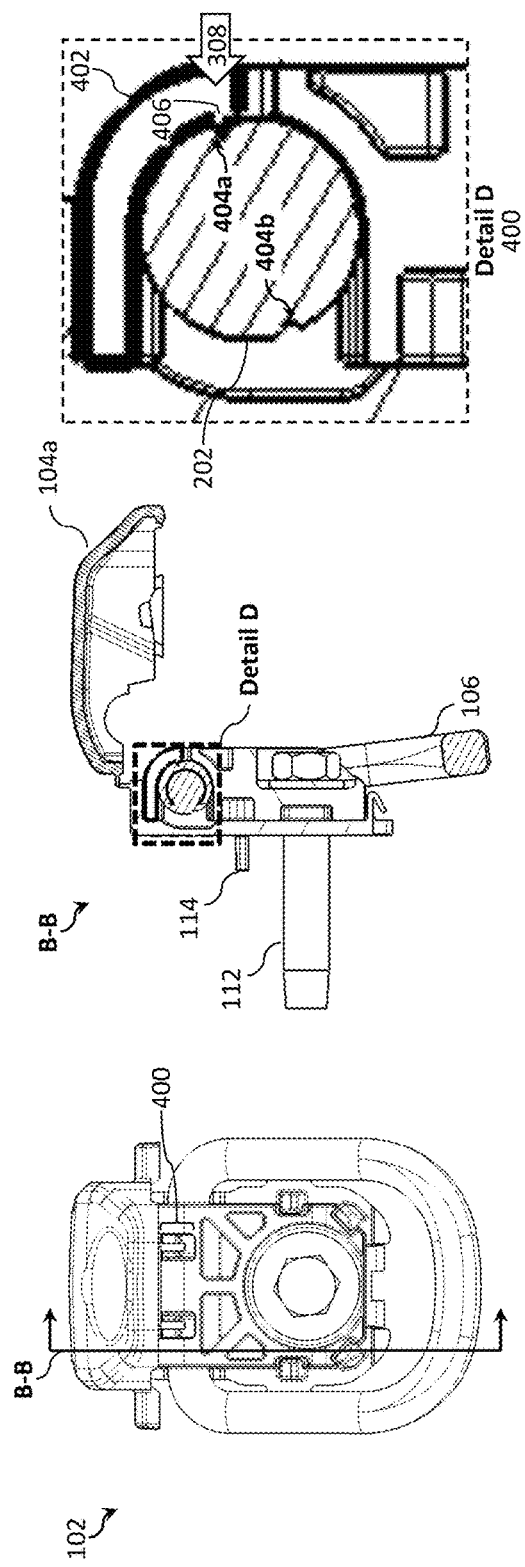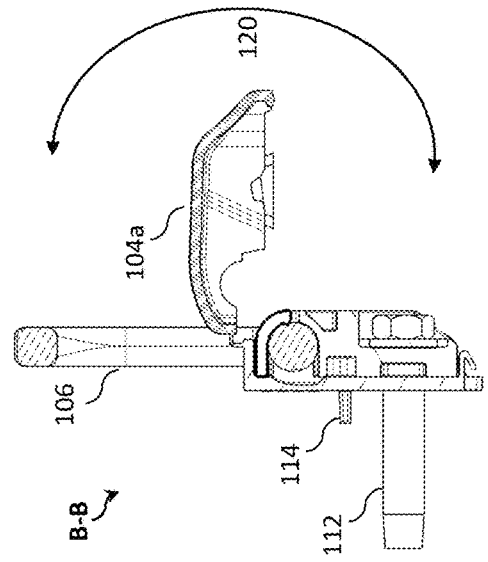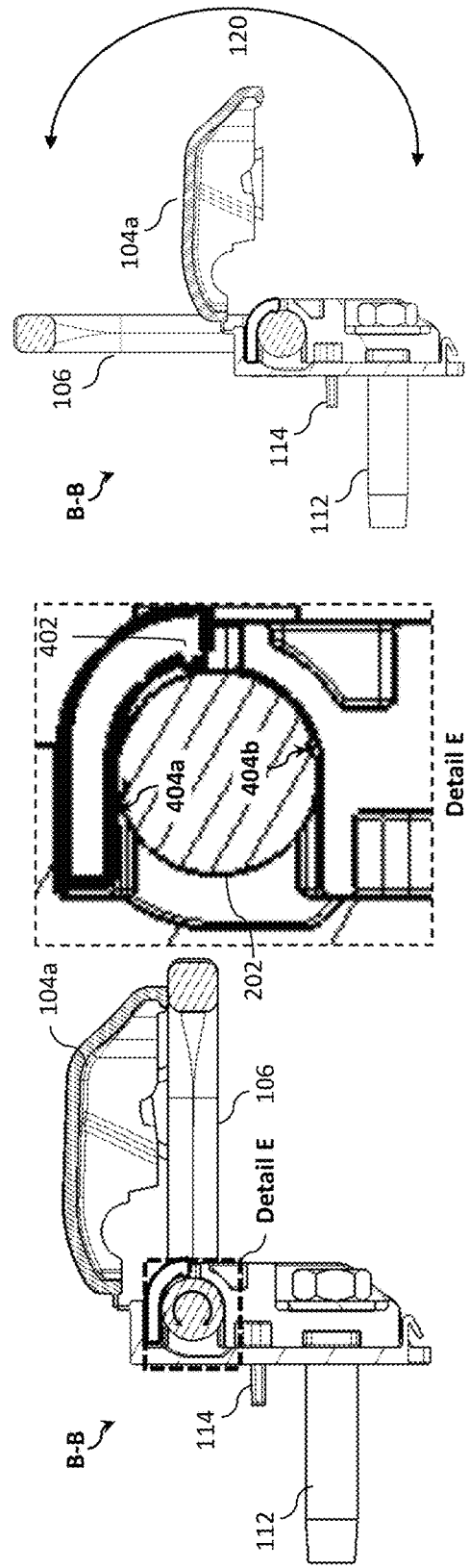

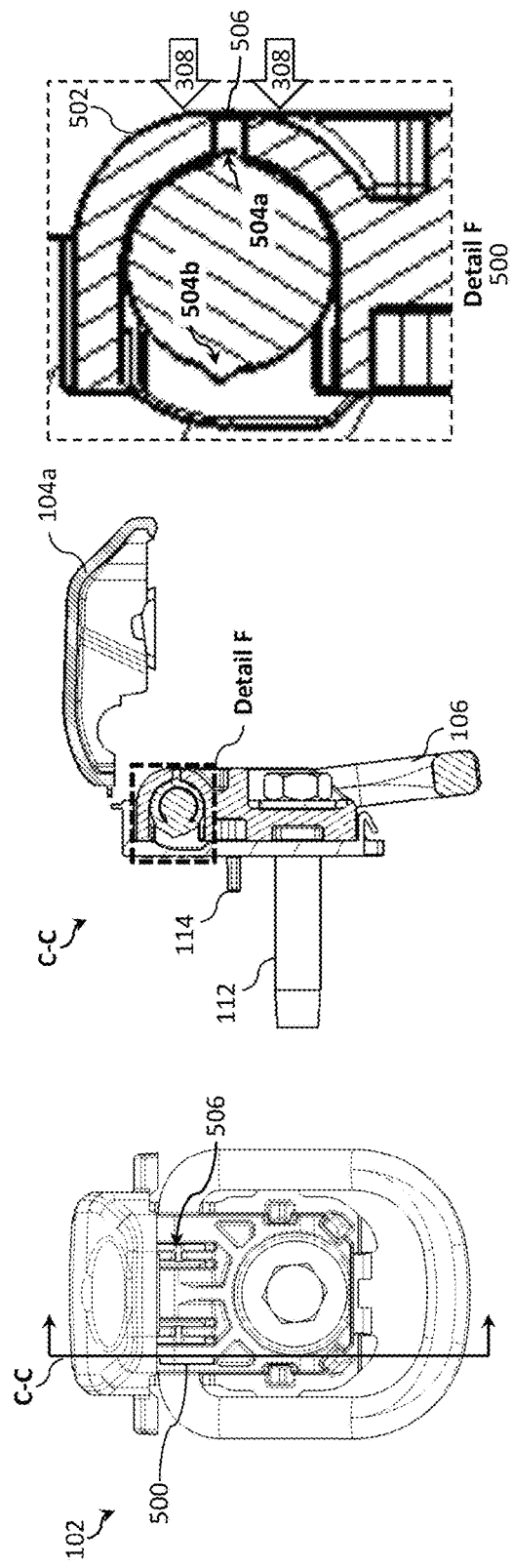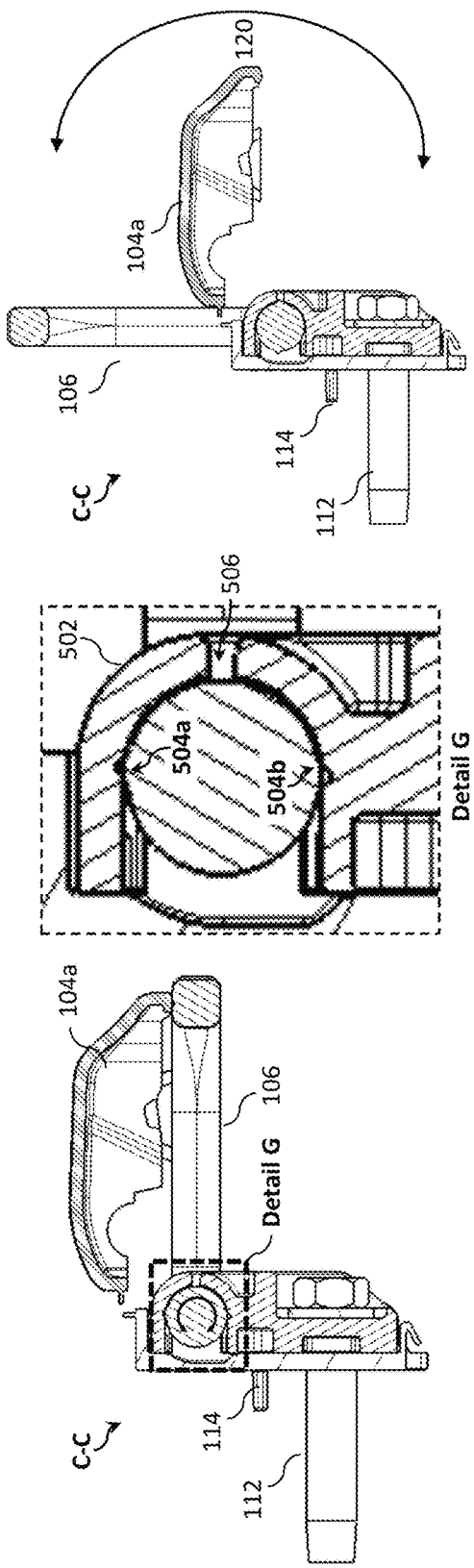
FIG. 5a
FIG. 5b
FIG. 5c
FIG. 5d

POSITION CLUTCH RING SYSTEM

CROSS-REFERENCE

The present application claims the benefit under 35 U.S.C. § 119(e) of U.S. Provisional Patent Application Nos. 63/177,651, filed Apr. 21, 2021, and 63/250,856 filed Sep. 30, 2021, each of which is entitled "Position Clutch Ring System," the contents of which are hereby incorporated by reference.

FIELD

The present disclosure relates generally to tie down assemblies configured to be affixed within a vehicle, more specifically, to a tie down assembly with a position-locking mechanism.

BACKGROUND

Tie down assemblies can be used for a variety of application to allow an operator to selectively secure a load (e.g., cargo, baggage, or the like). In some examples, the load is attached to the vehicle using a lead, such as straps, ropes, strips, cordage, netting, or another suitable securing wrapping band. The lead can be removably attached to the vehicle using a tie down assembly, which is affixed to the vehicle. One known application is tie down assemblies associated with the trunk or cargo area of a vehicle. For example, U.S. Pat. No. 6,030,159 to Herrick et al. describes a cargo tie down system for use in securing cargo to a transport vehicle.

Known tie down assemblies, which are traditionally metal, have issues with high rotational forces, which introduce ergonomic issues. Further, existing metal tie down assemblies are heavy in weight and have a tendency to clank or rattle with no adjustable control, which often results in buzzing, squeaking, and rattling (BSR). In addition, complex bends and folds in the metal portions create higher cost of part production and a large tolerance. Finally, metal tie down assemblies cannot easily be color-matched to other materials, which can be problematic for interior applications. Therefore, a need exists for a tie down assembly that addresses the forgoing, such as a tie down assembly with a position-locking mechanism as disclosed herein.

SUMMARY

The present disclosure relates generally to tie down assemblies configured to be affixed within a vehicle, more specifically, to a tie down assembly with a position-locking mechanism, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1a illustrates a vehicular component having a tie down assembly in accordance with an aspect of the present disclosure.

FIG. 1b illustrates a front elevational view of the tie down assembly in a closed position.

FIGS. 1c and 1d illustrate, respectively, top and side elevational views of the tie down assembly in an open position.

FIG. 2a illustrates a front perspective view of the tie down assembly in a closed position FIGS. 2b through 2e illustrate, respectively, bottom, top, rear, and side elevational views of the tie down assembly.

FIG. 3a illustrates a tie down assembly configured with a first detent mechanism in accordance with a first aspect of the present disclosure in an open position.

FIGS. 3b through 3d illustrate, respectively, cross-sectional views of the tie down assembly taken along cut line A-A at a first rotational position, a second rotational position, and a third rotational position.

FIG. 4a illustrates a tie down assembly configured with a second detent mechanism in accordance with a second aspect of the present disclosure in an open position.

FIGS. 4b through 4d illustrate, respectively, cross-sectional views of the tie down assembly taken along cut line B-B at a first rotational position, a second rotational position, and a third rotational position.

FIG. 5a illustrates a tie down assembly configured with a third detent mechanism in accordance with a third aspect of the present disclosure in an open position.

FIGS. 5b through 5d illustrate, respectively, cross-sectional views of the tie down assembly taken along cut line C-C at a first rotational position, a second rotational position, and a third rotational position.

DESCRIPTION

Figure 2F:
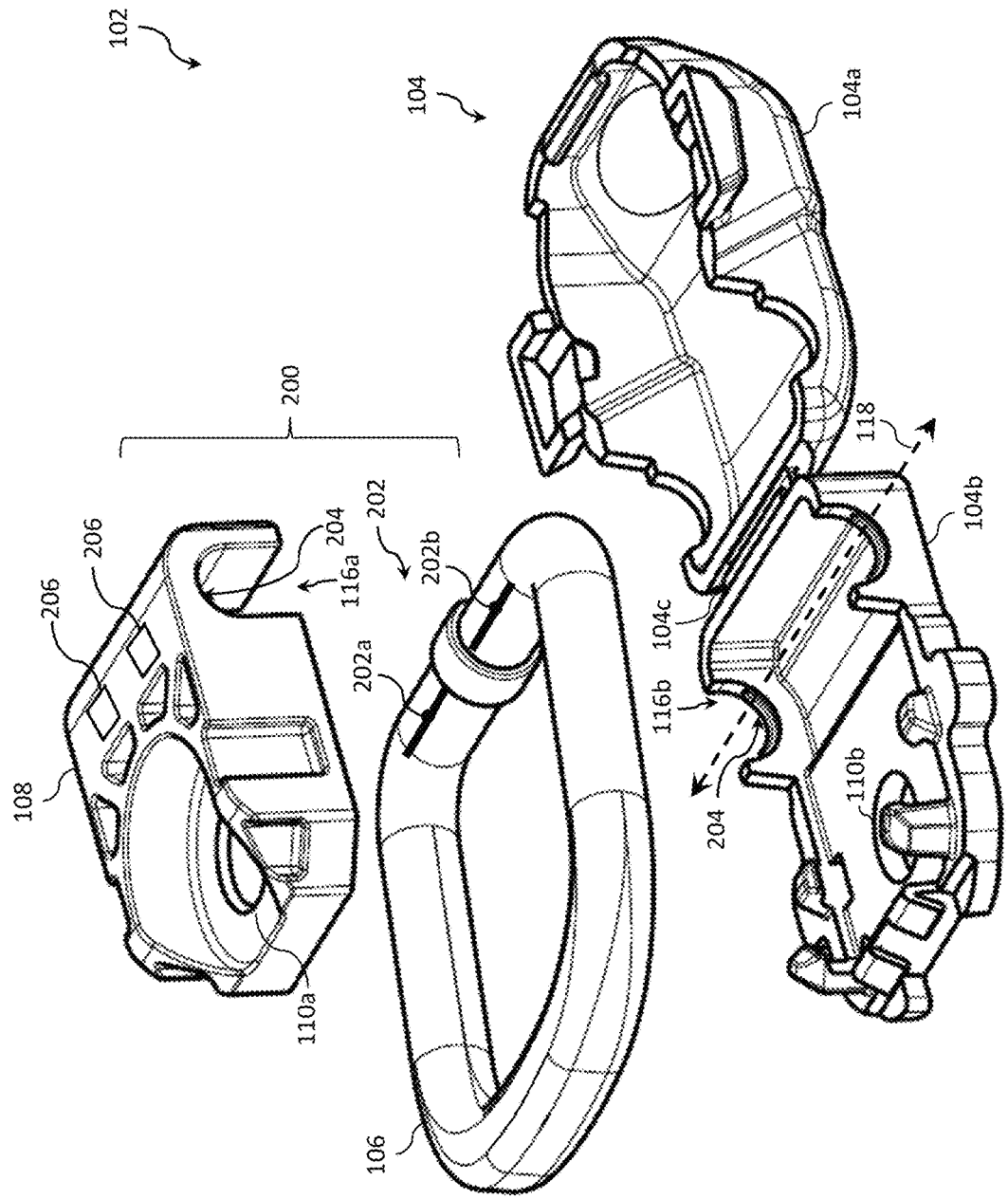
FIG. 2f illustrates an assembly view of the tie down assembly.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

This disclosure relates to tie down assemblies configured to be affixed within a vehicle, more specifically, to a tie down assembly with a position-locking mechanism. Such tie down assemblies are configured to be affixed in, for example, a trunk, cargo area, or other portion of the vehicle interior, but is not limited to those areas of application. Example vehicles include, without limitation, automobile, trucks, buses, aircraft, locomotives, marine vessels, and the like. While described primary in connection with a vehicle, the disclosed tie down assemblies may be employed wherever a need to tie, contain, or otherwise secure a load is needed or desired.

As explained above, known metal tie down assemblies can introduce ergonomic issues, are heavy in weight, have a tendency to clank or rattle with no adjustable control, yield a higher cost of part production and a large tolerance, and cannot easily be color matched to other materials. While these may not be problematic for applications where the tie down assemblies are used on the exterior, used in construction, heavy duty, or the like, use of such tie down assemblies on the interior of a vehicle can be bothersome to an operator. To that end, disclosed herein is a tie down assembly for a vehicle with a position-locking mechanism. The tie down assembly may be molded from, or otherwise fabricated using, plastic, such as polypropylene, polyvinyl chloride (PVC), polycarbonate, or acrylonitrile butadiene styrene (ABS).

As will be discussed, the tie down assembly includes a ring that is molded or otherwise fabricated with engagement features that define a position-locking mechanism configured to control movement of the ring and to mitigate or remove BSR. The cantilever engagement features between the ring and stationary portion of the tie down assembly provide for force and positional control. Adjustable rotation resistance can be desirable as the operator can more easily control and set the rotational position of the ring. As the tie down assembly, or portions thereof, is fabricated using plastic, the tie down assembly is lightweight and can be configured to snap together to ease assembly, thereby simplifying assembly. Finally, the plastic can be color matched (or otherwise specified) to the interior of the vehicle or another color of a customer's choice.

In a first examples, a tie down assembly comprises: a ring; a bracket assembly; a support insert configured to secure the ring relative to the bracket assembly, wherein the ring is configured to rotate relative to the bracket assembly about an axis; and a position-locking mechanism configured to secure the ring at one or more rotational positions about said axis via one or more engagement features.

In a second example, a tie down assembly comprises: a ring; a bracket assembly; a support insert configured to secure the ring relative to the bracket assembly, wherein the ring is configured to rotate relative to the bracket assembly about an axis; and a first engagement feature formed on the ring and a second engagement feature formed on the support insert, wherein the first and second engagement features are configured to secure the ring at one or more rotational positions about said axis.

In some examples, the position-locking mechanism is a detent mechanism. In some examples, the one or more engagement features comprises a cantilever feature and one or more detent features. In some examples, the cantilever feature is formed in or on the support insert and the one or more detent features are formed in or on the ring. In some examples, the ring includes a cylindrical portion that comprises the one or more detent features. In some examples, the one or more engagement features comprises one or more protrusions and an opening feature. In some examples, the opening feature is formed in or on the support insert and the one or more protrusions are formed in or on the ring. In some examples, the bracket assembly comprises a cover, a base component, and a hinge that pivotally joins the cover and the base component. In some examples, the cover, the base component, and the hinge are fabricated as a single component. In some examples, the cover defines a cavity with the base component that houses the support insert when in a closed position. In some examples, the cover and the base component are configured to couple to one another via one or more engagement features when in a closed position. In some examples, the support insert defines a first opening and the bracket assembly defines a second opening. In some examples, the first opening and the second opening define an opening configured to receive a fastener. In some examples, the ring is a D-ring. In some examples, at least a portion of the ring is over molded. In some examples, the base component comprises one or more projections extending outwardly from a surface of the base component. In some examples, the one or more projections are configured to mitigate rotational movement of the tie down assembly relative to a vehicular component. In some examples, one of the first and second engagement features is a projection and the other of the first and second engagement features is a detent.

FIG. 1a illustrates a vehicular component 100 having a tie down assembly 102 in accordance with an aspect of the present disclosure. The vehicular component 100 may be a door panel, as shown, or any other component of a vehicle or other structure to which it is desirable to attach a tie down assembly 102. Detail A provides an enlarged view of the tie down assembly 102. As illustrated, in some examples, the tie down assembly 102 is positioned within a recess 101 formed within the vehicular component 100 to reduce obstruction and/or provide a flush installation.

FIG. 1b illustrates a front elevational view of the tie down assembly 102 in a closed position, while FIGS. 1c and 1d illustrate, respectively, top and side elevational views of the tie down assembly 102 in an open position. With reference to FIG. 1b, the tie down assembly 102 generally comprises a bracket assembly 104 and a ring 106. The ring 106 may be a D-ring as illustrated, though other shapes are contemplated. As can be appreciated by those of skill in the art, a D-ring is a D-shaped in that it has a least one linear portion (typically at the point of attachment to the bracket assembly 104), such as a cylindrical portion.

Turning to FIGS. 1c and 1d, the ring 106 is configured to rotate relative to the bracket assembly 104 about axis 118 defined by the cylindrical portion as indicated by arrow 120. As illustrated, axis 118 is generally coaxial with a cylindrical portion of the ring 106 (a D-ring, for example), such that the ring 106 can lie flat (relative to the surface of the vehicular component 100) when not in use and to extend outwardly at a desired angle when access to the ring 106 is needed for attachment with a lead.

The ring 106 is secured to the bracket assembly 104 via a support insert 108. The bracket assembly 104 and support insert 108 are shaped to collectively define a channel 116 in which the linear portion of the ring 106 resides (and rotates about the axis 118). The bracket assembly 104 and support insert 108 serve as the attachment structure to the vehicular component 100 and, to that end, collectively define an opening 110 through which a fastener 112 passes and attaches to the vehicular component 100. For example, as seen in FIG. 2f, the support insert 108 defines a first opening 110a and the bracket assembly 104 defines a second opening 110b that is concentric with the first opening 110a when the tie down assembly 102 is assembled with the bracket assembly 104. Having the fastener 112 pass through both the support insert 108 and the bracket assembly 104 increases the overall strength of the tie down assembly 102.

The bracket assembly 104 generally comprises a cover 104a, a base component 104b, and a hinge 104c that pivotally joins the cover 104a and the base component 104b as also indicated by arrow 120. The bracket assembly 104 may be molded or otherwise fabricated as a single component or, if desired, as multiple components and later joined together through, for example, ultra-sonic welding, adhesives, etc. One or both of the cover 104a and the base component 104b includes one or more engagement features 122 (e.g., clips, snaps, etc.) such that the cover 104a can attach or couple to the base component 104b when in the closed position. When in the closed position, the cover 104a defines a cavity with the base component 104b that houses (and hides) the support insert 108 and the head of the fastener 112, thereby improving the cosmetic appearance of the overall tie down assembly 102. In some examples, one or more components of the tie down assembly 102 may be over molded with a second material to provide a desired texture, finish, or the like. In some examples, only portions of the tie down assembly 102 are over molded to reduce cost (e.g., those portions that are visible when assembled).

While the tie down assembly 102 is generally described as being fabricated from plastic, in some examples, one or more components (or portions thereof) may be fabricated from another material (e.g., metal) to meet a particular application. Use of metal, however, would likely increase cost and/or complexity of the overall tie down assembly 102.

FIG. 2a illustrates a front perspective view of the tie down assembly 102 in a closed position, while FIGS. 2b through 2e illustrate, respectively, bottom, top, rear, and side elevational views of the tie down assembly 102. FIG. 2f illustrates an assembly view of the tie down assembly 102. As best illustrated in FIGS. 2d and 2e, in some examples, the base component 104b may define one or more projections 114 that engage the vehicular component 100. For example, the one or more projections 114 may extend outwardly from a surface (e.g., a rear surface) of the base component 104b. The one or more projections 114 may be shaped as a blade that is sized and shaped to be inserted into a corresponding opening on the vehicular component 100. The one or more projections 114 serve to mitigate rotational movement of the tie down assembly 102 via the base component 104b relative to the vehicular component 100 when only a single fastener 112 is used.

FIG. 2f best illustrates assembly of the tie down assembly 102. As noted above, the support insert 108 is shaped to define a first channel portion 116a and the bracket assembly 104 is shaped to define a second channel portion 116b. The first channel portion 116a and second channel portion 116b collectively define a channel 116. The channel 116 is sized and shaped to correspond to the shape of the cylindrical portion 202 of the ring 106, which is illustrated as a generally linear feature/portion of the ring 106. As illustrated, the channel 116 may contact the cylindrical portion 202 at a first interface point 202a and a second interface point 202b.

In some examples, an interface material 204 may be provided at the first interface point 202a and the second interface point 202b (whether on the cylindrical portion 202 or the channel 116) to increase durability and/or to provide a desired amount of friction between the ring 106 and the remainder of the tie down assembly 102—i.e., at the channel 116. The type of friction material 204 may be selected depending on durability requirements and/or the amount of desired friction (e.g., an elastomer may be used when high friction is desired, whereas nylon may be used when low friction is desired).

As will be described in connection with the following examples, one or more engagement features 206 may be provided at or along the channel 116 and/or cylindrical portion 202 (e.g., at the first interface point 202a and the second interface point 202b) to yield a position-locking mechanism 200 (e.g., a detent mechanism) configured to secure the ring 106 at one or more rotational positions relative to the bracket assembly 104 and support insert 108. In some examples, the engagement features 206 are formed in or on the support insert 108 or the cylindrical portion 202 to define the position-locking mechanism 200. For example, the engagement features 206 on the cylindrical portion 202 may be one or more detent features and the engagement features 206 on the support insert 108 may be a one or more protrusions features (or vice versa).

FIG. 3a illustrates a tie down assembly 102 configured with a first detent mechanism 300 in an open position, while FIGS. 3b through 3d illustrate, respectively, cross-sectional views of the tie down assembly 102 taken along cut line A-A at a first rotational position, a second rotational position, and a third rotational position. In this example, the first rotational position is a downward position (e.g., a rest position, which is at about 0 degrees), the second rotational position is an intermediate position (e.g., about 90 degrees) between the first and section rotational positions, and the third rotational position is an upward position (e.g., about 180 degrees). As will be appreciated, the intermediate position may or may not be a fixed position (e.g., associated with a detent feature).

The first detent mechanism 300 comprises a cantilever feature 302 and one or more detent features (e.g., first and second detent features 304a, 304b). The first and second detent features 304a, 304b are, in effect, holes, dimples, or other recesses formed in or on the ring 106 (e.g., in the cylindrical portion 202). As illustrated, the support insert 108 can define the cantilever feature 302. While the cantilever feature 302 of support insert 108 is illustrated at two locations, additional or fewer locations may be provided depending on a size and requirements of the tie down assembly 102. The cantilever feature 302 is designed so that protrusion feature 306 rests in and/or otherwise engages one of a first detent feature 304a and second detent feature 304b of ring 106 (e.g., positioned at the first interface point 202a and the second interface point 202b). The ring 106 is configured to rotate about axis 118 in either direction as indicated by arrow 120 between the first rotational position defined by first detent feature 304a (FIGS. 3a and 3b) and the third rotational position defined by second detent feature 304b (FIG. 3d). The tie down assembly 102 and/or first detent mechanism 300 should not be construed as limited to only two positions. To that end, additional detent features may be added to the cylindrical portion 202 about the axis 118 to enable the operator to secure the ring 106 at one or more additional rotational positions. For example, as alluded to above, the second rotational position may be a fixed position associated with a detent feature. Upon rotating the ring 106 between the first rotational position defined by first detent feature 304a and third rotational position defined by second detent feature 304b, the cantilever feature 302 will flex and apply a constant force 308 on cylindrical portion 202 of ring 106. The constant force 308 allows for consistent and controlled movement.

FIG. 4a illustrates a tie down assembly 102 configured with a second detent mechanism 400 in an open position, while FIGS. 4b through 4d illustrate, respectively, cross-sectional views of the tie down assembly 102 taken along cut line B-B at a first rotational position, a second rotational position, and a third rotational position. In this example, the first rotational position is a downward position (e.g., a rest position, which is at about 0 degrees), the second rotational position is an intermediate position (e.g., about 90 degrees) between the first and section rotational positions, and the third rotational position is an upward position (e.g., about 180 degrees). As will be appreciated, the intermediate position may or may not be a fixed position (e.g., associated with a detent feature).

The second detent mechanism 400 comprises a cantilever feature 402 and one or more detent features (e.g., first and second detent features 404a, 404b). As illustrated, the support insert 108 defines the cantilever feature 402. The cantilever feature 402 operates in substantially the same manner as the cantilever feature 302 of FIGS. 3a through 3d, but is differently shaped and extends from the opposed side. Again, while the cantilever feature 402 of support insert 108 is illustrated at two locations, additional or fewer locations may be provided depending on a size and requirements of the tie down assembly 102. The cantilever feature 402 is designed so that protrusion feature 406 formed thereon rests in and/or otherwise engages one of a first detent feature 404a and a second detent feature 404b of ring 106 (e.g., positioned at the first interface point 202a and the second interface point 202b). The ring 106 is configured to rotate about axis 118 in either direction as indicated by arrow 120 between the first rotational position defined by first detent feature 404a (FIGS. 4a and 4b) and the third rotational position defined by second detent feature 404b (FIG. 4d). The tie down assembly 102 and/or second detent mechanism 400 should not be construed as limited to only two positions. To that end, as with the prior example, additional detent features may be added to the cylindrical portion 202 about the axis 118 to enable the operator to secure the ring 106 at one or more additional rotational positions. Upon rotating the ring 106 between the first rotational position defined by first detent feature 404a and third rotational position defined by second detent feature 404b, the cantilever feature 402 will flex and apply a constant force 308 on cylindrical portion 202 of ring 106.

FIG. 5a illustrates a tie down assembly 102 configured with a third detent mechanism 500 in an open position, while FIGS. 5b through 5d illustrate, respectively, cross-sectional views of the tie down assembly 102 taken along cut line C-C at a first rotational position, a second rotational position, and a third rotational position. In this example, the first rotational position is a downward position (e.g., a rest position, which is at about 0 degrees), the second rotational position is an intermediate position (e.g., about 90 degrees) between the first and section rotational positions, and the third rotational position is an upward position (e.g., about 180 degrees). As will be appreciated, the intermediate position may or may not be a fixed position (e.g., associated with a detent feature).

The third detent mechanism 500 comprises a cantilever feature 502 and one or more protrusions features (e.g., first and second protrusion features 504a, 504b). The third detent mechanism 500 is generally similar in operation to the first and second detent mechanisms 300, 400, but, in this example, protrusion features 504a, 504b are formed on the cylindrical portion 202 of ring 106 rather than detent features. As illustrated, the support insert 108 defines the cantilever feature 502, which, in this example, forms an opening feature 506 to engage/receive the protrusion features 504a, 504b. As with the prior examples, while the cantilever feature 502 of support insert 108 is illustrated at two locations, additional or fewer locations may be provided depending on a size and requirements of the tie down assembly 102. The cantilever feature 502 is designed so that opening feature 506 engages a first protrusion 504a and a second protrusion 504b of ring 106 (e.g., positioned at the first interface point 202a and the second interface point 202b). The ring 106 is configured to rotate about axis 118 in either direction as indicated by arrow 120 between the first rotational position defined by first protrusion 504a (FIGS. 5a and 5b) and the third rotational position defined by second protrusion 504b (FIG. 5d). The tie down assembly 102 and/or third detent mechanism 500 should not be construed as limited to only two positions. To that end, additional protrusions may be added to the cylindrical portion 202 about the axis 118 to enable the operator to secure the ring 106 at one or more additional rotational positions. Upon rotating the ring 106 between the first rotational position defined by first protrusion 504a and third rotational position defined by second protrusion 504b, the cantilever feature 502 will flex and apply a constant force 308 on cylindrical portion 202 of ring 106. The constant force 308 allows for consistent and controlled movement.

Figure 6B:
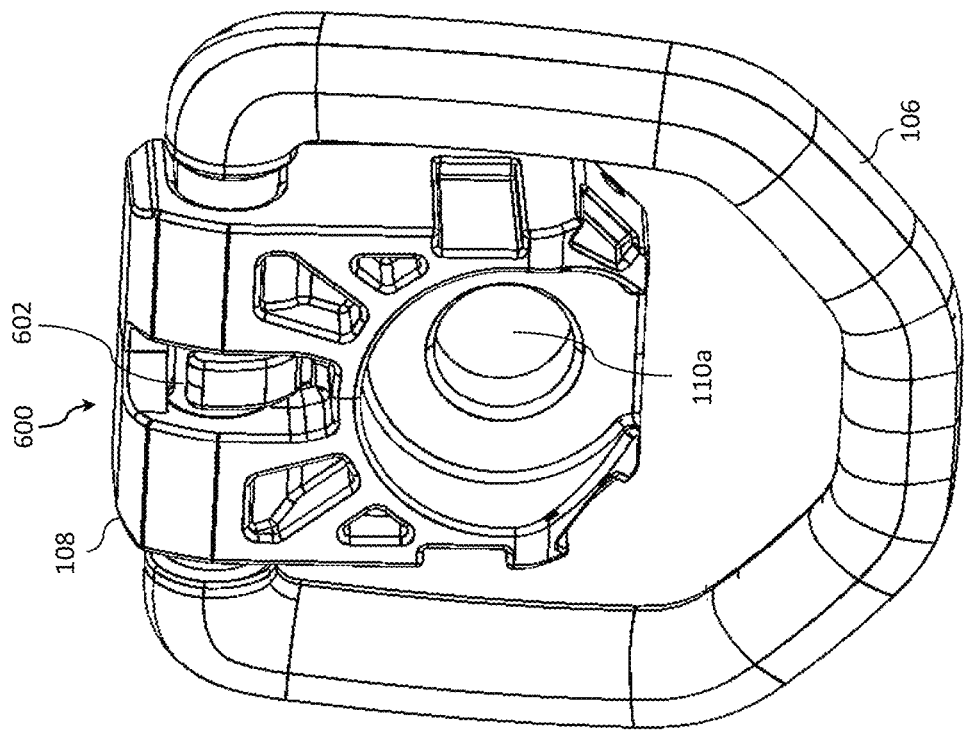
FIGS. 6a and 6b illustrates a tie down assembly configured with a single detent mechanism in accordance with a fourth aspect of the present disclosure.
Figure 6A:
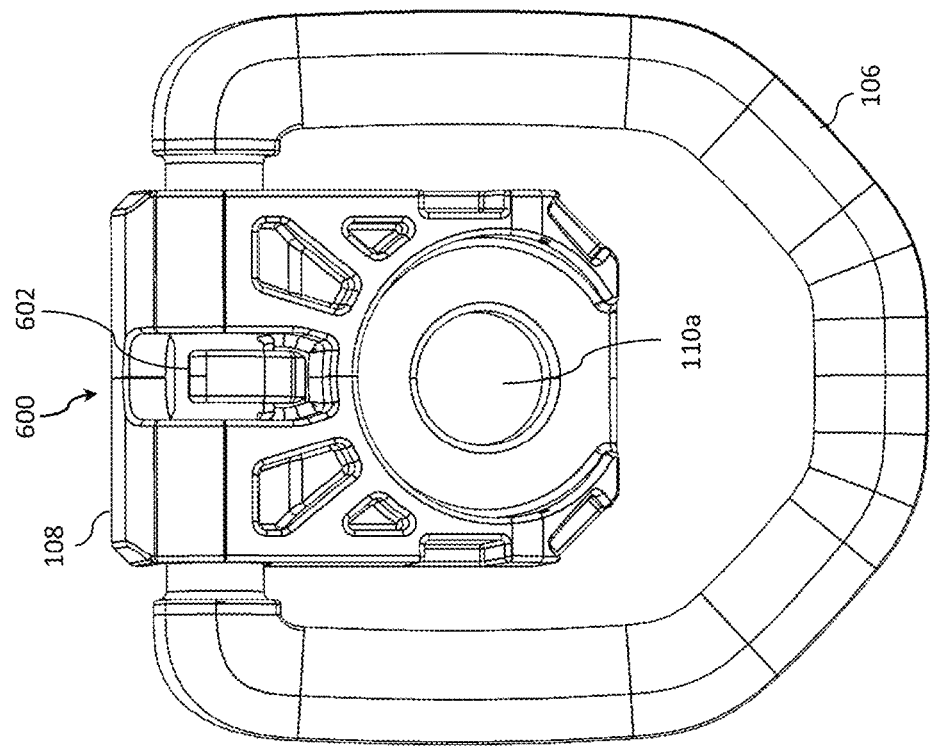

While the tie down assemblies 102 of FIGS. 3a through 3d, 4a through 4d, and 5a through 5d each employ multiple detent mechanisms (e.g., two detent mechanisms), it is contemplated that additional or fewer detent mechanisms may be used on each tie down assemble 102. For example, the tie down assembly 102 of FIGS. 6a and 6b employs a single detent mechanism. More specifically, FIGS. 6a and 6b illustrates a tie down assembly configured with a single detent mechanism 600 in accordance with a fourth aspect of the present disclosure. The detent mechanism 600 comprises a cantilever feature 602 configured to engage one or more protrusions features on the cylindrical portion of ring 106. The detent mechanism 600 is generally similar in operation to the detent mechanisms described in connection with the other example tie down assemblies 300, 400, 500.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A tie down assembly comprising:
   a ring;
   a bracket assembly;
   a support insert configured to secure the ring relative to the bracket assembly, wherein the ring is configured to rotate relative to the bracket assembly about an axis, wherein the support insert defines a first opening and the bracket assembly defines a second opening; and
   a position-locking mechanism configured to secure the ring at one or more rotational positions about said axis via one or more engagement features.

2. The tie down assembly of claim 1, wherein the position-locking mechanism is a detent mechanism.

3. The tie down assembly of claim 2, wherein the one or more engagement features comprises a cantilever feature and one or more detent features.

4. The tie down assembly of claim 3, wherein the cantilever feature is formed in or on the support insert and the one or more detent features are formed in or on the ring.

5. The tie down assembly of claim 4, wherein the ring includes a cylindrical portion that comprises the one or more detent features.

6. The tie down assembly of claim 2, wherein the one or more engagement features comprises one or more protrusions and an opening feature.

7. The tie down assembly of claim 6, wherein the opening feature is formed in or on the support insert and the one or more protrusions are formed in or on the ring.

8. The tie down assembly of claim 1, wherein the bracket assembly comprises a cover, a base component, and a hinge that pivotally joins the cover and the base component.

9. The tie down assembly of claim 8, wherein the cover, the base component, and the hinge are fabricated as a single component.

10. The tie down assembly of claim 8, wherein the cover defines a cavity with the base component that houses the support insert when in a closed position.

11. The tie down assembly of claim 8, wherein the cover and the base component are configured to couple to one another via one or more engagement features when in a closed position.

12. The tie down assembly of claim 1, wherein the first opening and the second opening define an opening configured to receive a fastener.

13. The tie down assembly of claim 8, wherein the ring is a D-ring.

14. The tie down assembly of claim 1, wherein at least a portion of the ring is over molded.

15. The tie down assembly of claim 8, wherein the base component comprises one or more projections extending outwardly from a surface of the base component.

16. The tie down assembly of claim 15, wherein the one or more projections are configured to mitigate rotational movement of the tie down assembly relative to a vehicular component.

17. A tie down assembly comprising:
    a ring;
    a bracket assembly;
    a support insert configured to secure the ring relative to the bracket assembly, wherein the ring is configured to rotate relative to the bracket assembly about an axis; and
    a first engagement feature formed on the ring and a second engagement feature formed on the support insert, wherein the first and second engagement features are configured to secure the ring at one or more rotational positions about said axis.

18. The tie down assembly of claim 17, where one of the first and second engagement features is a projection and the other of the first and second engagement features is a detent.

19. A tie down assembly comprising:
    a ring;
    a bracket assembly, wherein the bracket assembly comprises a cover, a base component, and a hinge that pivotally joins the cover and the base component;
    a support insert configured to secure the ring relative to the bracket assembly, wherein the ring is configured to rotate relative to the bracket assembly about an axis; and
    a position-locking mechanism configured to secure the ring at one or more rotational positions about said axis via one or more detents.

20. The tie down assembly of claim 19, wherein the cover, the base component, and the hinge are fabricated as a single component.

* * * * *